3,234,182
POLYOLS FROM POLY(HALOMETHYL)-DIPHENYL ETHERS

Harold O. Seeburger and Lee H. Horsley, Midland, Mich., assignors to The Dow Chemical Company, Midland, Mich., a corporation of Delaware
No Drawing. Filed Dec. 20, 1962, Ser. No. 246,007
7 Claims. (Cl. 260—47)

This invention relates to new polyols and more particularly to new polyols derived from poly(halomethyl) diphenyl ethers. Still more particularly, it relates to novel polyols containing a plurality of diphenyl ether moieties linked with polyalkylenoxy chains each containing an average of at least five alkylenoxy units.

These novel polyols are obtained by the condensation of a poly(halomethyl)diphenyl ether with a polyalkylenoxy polyol, more commonly known as a polyglycol, wherein the mole ratio of hydroxyl to halomethyl groups in the reaction mixture is from about 1.2 to 2.0. Suitable reactants for this condensation reaction are halomethyldiphenyl ethers and mixtures thereof having an average of from 1.75 to 3.00 halomethyl groups per diphenyl ether moiety, each halomethyl group being either chloromethyl or bromoethyl; and polyglycols selected from the group consisting of:

(a) Polyalkylenoxy diols having an average molecular weight of from 300 to 10,000 and
(b) Mixtures of said polyalkylenoxy diols with a polyalkylenoxy triol having an average molecular weight of from 700 to 3,000, wherein the mole ratio of diol to triol is at least one.

The polyols described herein are characterized by low volatility and high thermal stability. Physically, they range from viscous liquids to hard, brittle waxes. Chemically these polyols are particularly valuable as intermediates in the synthesis of polyesters and polyurethanes. Because of their terminal hydroxyl groups they provide a convenient means for the incorporation of the diphenyl ether moiety in the structure of these polymeric materials. This incorporation imparts such highly desirable properties as improved water resistance and improved low temperature flexibility. Furthermore, many of the water-soluble polyols have valuable surfactant and emulsifying characteristics. Other products are insoluble in water but soluble in common organic solvents such as acetone, dioxane, alcohol and dimethyl formamide. The thermal stability of these organic-soluble polyols is particularly beneficial in the use of these materials as lubricants and hydraulic fluids.

Inherent in the condensation processes that may be used to obtain these polyols is a considerable flexibility. Such factors as the structure and length of the polyalkylenoxy groups, the extent and type of cross-linking, and the ratio of the hydroxyl to chloromethyl content are particularly important. For example, by appropriate choice of a hydrophilic polyethylene glycol or a hydrophobic polypropylene or polybutylene glycol, the hydrophilic-hydrophobic nature of the resulting condensation product can be controlled. Polyglycols containing more than one type of alkylenoxy unit, i.e., heteric or block copolymers, offer still further flexibility. Also, the extent and type of cross-linking may be varied widely by appropriate choice of the amount of trifunctional reactant. Polyalkylenoxy triols, tris(halomethyl)diphenyl ether, or mixtures thereof can be used to provide cross-linking. The ratio of hydroxyl to chloromethyl content in the reactant mixture obviously influences the chain length of the polyol, longer chains and higher molecular weight products being generally obtained with a ratio of 1.2 compared with a ratio of 1.7.

The poly(halomethyl)diphenyl ethers utilized as starting materials in the synthesis of these polyols are readily obtained by chloromethylation and/or bromomethylation of diphenyl ether, preferably as described by Doedens in U.S. Patent 2,911,380. The halomethyldiphenyl ether product as prepared is usually a mixture of isomers and homologues having a varying number of halomethyl groups per diphenyl ether moiety. However, individual components may be isolated by such means as fractional distillation under reduced pressure. Particularly desirable as intermediates in the synthesis of the polyols described herein are the 4,4'-bis(halomethyl)diphenyl ethers which are recovered in high yields from crude halomethylation products by the process described by Doedens and Rosenbrock in U.S. Patent 3,004,072.

Even though individual poly(halomethyl)diphenyl ethers having two or more halomethyl groups per diphenyl ether moiety can be isolated, purified and used, a crude halomethylation product having an average of at least 1.75 halomethyl groups per diphenyl ether moiety is often advantageously employed in the preparation of the polyols described herein. For example, valuable polyol products are obtained using a crude poly(chloromethyl)diphenyl ether containing 25.2 weight percent chlorine and having an average of 1.85 chloromethyl groups per diphenyl ether (DPE) moiety. A typical composition of this crude poly(chloromethyl)diphenyl ether is:

| | Mole percent |
|---|---|
| 2-chloromethyl DPE | 0.3 |
| 4-chloromethyl DPE | 2.4 |
| 2,4'-bis(chloromethyl)DPE | 17.7 |
| 4,4'-bis(chloromethyl)DPE | 68.5 |
| Tris(chloromethyl)DPE | 10.5 |
| Tetrakis(chloromethyl)DPE | <1 |

Other crude halomethylation products can also be used in a similar manner. Particularly satisfactory results are obtained with a crude mixture containing an average of about 2 halomethyl groups per diphenyl ether moiety.

Polyalkylenoxy glycols prepared by the condensation of ethylene, propylene, butylene oxides, or mixtures thereof with an appropriate initiator are commercial products generally known as polyglycols. With water or a diol such as ethylene or propylene glycol as an initiator, polyalkylenoxy diols are obtained having the general structure $$HO(C_aH_{2a}O)_nH$$

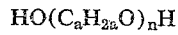

wherein $a$ is an integer from 2 to 4 inclusive, and $n$ is the number of alkylenoxy groups in the polyglycol chain. Such polyalkylenoxy diols are available commercially with average molecular weights ranging from 200 to 20,000 and more. But for the synthesis of the polyols described herein, polyalkylenoxy diols having an average molecular weight greater than about 300 are required.

Polyalkylenoxy triols are readily prepared using a trihydroxy alcohol such as glycerine, trimethylolethane, trimethoxypropane, or 1,2,6-hexanetriol as initiator. In the present invention, polyalkylenoxy triols having an average molecular weight in the range from 700 to 3,000 are preferred.

As indicated above, the nature of the polyol product is influenced not only by the properties of the polyglycol, but also by the ratio of hydroxyl to halomethyl groups. In the reaction of a bis(halomethyl)diphenyl ether with a polyalkylenoxy diol, a ratio of hydroxy to chloromethyl groups in the reaction mixture of from about 1.2 to 2.0 is required. If a ratio less than about 1.2 is employed, the resulting polyol is generally a sticky mass insoluble in both aqueous and nonaqueous solvents. With a ratio greater than 2.0 polyols are obtained which do not have the prerequisite plurality of diphenyl ether moieties.

The extent of cross-linking is a further factor in determining the properties of the condensation product. When a polyalkylenoxy triol is employed with a poly(halomethyl)diphenyl ether having an average of about 2.0 halomethyl groups per diphenyl ether moiety, the mole ratio of diol to triol must be greater than one. If the average halomethyl content of the poly(halomethyl) diphenyl ether is appreciably greater than 2.0, the proportion of triol relative to diol must be reduced to compensate for cross-linking with the tris(halomethyl)diphenyl ether. Alternately, mono(halomethyl)diphenyl ether can be added to reduce the average halomethyl content. More exact formulations within the scope of this invention are easily determined by those skilled in the art.

The basic condensation reaction employed herein is shown in the following equation for the reaction of a bis(halomethyl)diphenyl ether with a polyalkylenoxy diol:

$$yXCH_2\phi O\phi CH_2X + (y+1)HO(AO)H \longrightarrow$$

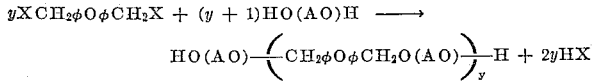

wherein X is Cl or Br and AO is a polyalkylenoxy group.

To achieve satisfactory yields, it is necessary to remove or neutralize the by-product hydrogen halide. Often this is done by including in the reaction mixture a suitable base usch as sodium hydroxide, potassium carbonate, and the like. But since the presence of such bases may cause undesirable hydrolysis of the reactants, it is advantageous to use an alkali metal salt of the polyglycol. In the preferred process, the sodium salt of the desired polyglycol or polyglycol mixture is prepared by reacting the polyglycol with metallic sodium. The amount of sodium used is preferably at least as great as the chemical equivalent of the halomethyl content of the diphenyl ether to be added subsequently.

In practice, the polyglycol is usually diluted with a liquid aromatic hydrocarbon or other inert solvent and the reaction with sodium carried out at room temperature or above, preferably at a temperature of from about 60 to 150° C. Depending on the proportions of reactants and the reaction conditions, up to 4 hours may be required for complete reaction of the sodium. Then the resulting solution or slurry is mixed with the poly(halomethyl)diphenyl ether and the condensation achieved by heating this reaction mixture at temperatures from about 90 to about 130° C. for a period of from 1 to 4 hours.

Although the above reactions are exothermic, control of the reaction temperature may be achieved by adjusting the rate of the addition of the reactants and the amount of cooling applied to the reaction mixture. It is generally preferable to add the poly(halomethyl)diphenyl ether portion-wise to the polyglycol mixture. When the condensation is essentially complete, the reaction mixture is treated in a conventional manner by distillation, washing, filtration, and the like to remove solvents, unreacted polyglycol, reaction by-products, and other impurities.

The condensation products obtained in this manner are polymeric and contain a plurality of diphenyl ether moieties. The properties of these polyols are largely determined by the nature of the polyglycol and proportions thereof utilized. Thus, the condensation product from a polyethylene glycol is generally water soluble and useful as a surfactant. Often the emulsification properties are enhanced by the incorporation of a small amount of cross-linking. On the other hand, products derived from polypropylene or polybutylene glycol are water-insoluble, viscous liquids, soluble in organic solvents such as kerosene and particularly useful as lubricants and hydraulic fluids.

The following examples, illustrative of compositions that may be prepared in accordance with the present invention, are not to be construed as limiting the invention. In these examples the following polyglycols, commercially available from The Dow Chemical Company, are employed:

DIOLS

Polyglycols E–400, E–600, E–1000, E–1450, E–2000 and E–9000;

Polyglycols P–400 and P–2000;

wherein E indicates a polyethylene glycol, P indicates a a polypropylene glycol, and the numeral indicates the average molecular weight.

TRIOLS

*Triol C.*—Polyglycol 11–100, a condensation product of glycerine and propylene oxide with an average molecular weight of about 1080.

*Triol A.*—Polyglycol 15–100, a condensation product of glycerine and an equimolar mixture of ethylene and propylene oxides with an average molecular weight of about 900.

*Triol.*—Polyglycol 15–200, same as Triol A but with an average molecular weight of about 2600.

Unless otherwise noted, all parts and percentages are by weight.

*Example I.—Diol condensation products*

A. A stirred solution of 240 parts (0.6 mole) of Polyglycol P–400 and 200 parts of ethylbenzene was heated to 100° C. Then, 22.1 parts (0.965 mole) of sodium was added and the mixture agitated at a temperature of from 105° to 115° C. for about four hours. After cooling the mixture to 70° C., 128 parts (0.48 mole) of 4,4'-bis(chloromethyl)diphenyl ether was added portion-wise at a rate such that the temperature was maintained at about 70° C. The final mole ratio of OH/—CH$_2$Cl was 1.25. Thereafter, the reaction mixture was stirred at 70° C. for an additional hour to insure complete reaction before removing the ethylbenzene by distillation. The residual viscous liquid was filtered to remove the insoluble sodium chloride giving a clear, viscous oil that was insoluble in water but soluble in acetone and cold kerosene. The product contained 1.08 wt. percent OH and had a viscosity of 95,000 centistokes (cks.) at 35° F. and 2,580 cks. at 100° F.

B. In a similar manner, 4,4'-bis(chloromethyl)diphenyl ether was condensed with Polyglycol P–2000 using a mole ratio of OH/—CH$_2$Cl of 1.25 to give a similar viscous liquid containing 0.42 wt. percent OH, and having a refractive index $n_D^{25}$ of 1.4629 and a viscosity of 2,125 cks. at 100° F. and 274 cks. at 210° F.

C. In a like manner condensation products were prepared from 4,4'-bis(chloromethyl) diphenyl ether and a variety of polyethylene glycols to give water-soluble condensation products, ranging from viscous liquids to hard, brittle waxes, which are useful as low-foaming surfactants and emulsifiers. Typical examples of such condensation polymers are given in Table 1. As a simple emulsifier test, 1 part of polyol, 9 parts of xylene, and 90 parts of water were thoroughly mixed by vigorous shaking, and then the time required for the emulsion to break was measured.

TABLE 1.—WATER-SOLUBLE PRODUCTS

| No. | Polyglycol | OH/—CH$_2$X[a] | Product | Cloud Point,[b] °C. | Emulsion Test, Min. |
|---|---|---|---|---|---|
| IC-1 | E-400 | 1.33 | Viscous liquid | 19 | <1 |
| IC-2 | E-1000 | 1.41 | Brittle wax | 60 | 5-10 |
| IC-3 | E-2000 | 2.00 | do | 90 | 5-10 |
| IC-4 | E-9000 | 1.31 | do | 100 | <2 |

[a] Mole ratio.
[b] 10% aqueous solution.

Similar reactions with polyethylene glycols wherein the mole ratio of OH/—CH$_2$Cl was less than about 1.15 gave polymeric materials that were insoluble in water as well as in the common organic solvents.

*Example II.—Diol/triol condensation products*

A. In a manner similar to that described in Example IA, to a mixture of 120 parts (0.3 mole) of Polyglycol E-400, 260 parts (0.1 mole) of Triol B and 200 parts of ethylbenzene, was added 15.5 parts (0.684 mole) of sodium. The mixture was heated with stirring at 105–110° C. for three hours. Then it was cooled to about 55° C. and 90 parts (0.337 mole) of 4,4'-bis(chloromethyl)diphenyl ether was added thereto and the mixture was stirred for one hour. The mole ratio of OH/—CH$_2$Cl was 1.33. After the solvent was removed by distillation and the product filtered to remove sodium chloride, there was obtained in essentially quantitative yield a viscous, water-soluble liquid. A 10% solution in water became cloudy when heated to 36° C. The product is a good emulsifier for water-oil mixtures. A 0.1% aqueous solution had a surface tension at room temperature of 39.3 dynes/cm. further indicating the surfactant properties of this product.

B. Other examples of water-soluble condensation products are given in Table 2. These materials are low-foaming surfactants and emulsifiers.

TABLE 2.—WATER-SOLUBLE PRODUCTS

| No. | Polyglycol | | Mole Ratios | | Product | Cloud Point[a] | Emulsion Test, Min.[b] |
|---|---|---|---|---|---|---|---|
| | Diol | Triol | Diol/Triol | OH/—CH$_2$X | | | |
| IIA | E-400 | B | 3 | 1.33 | Viscous liquid | 36 | >480 |
| IIB-1 | E-400 | A | 1 | 1.33 | do | 19 | >480 |
| IIB-2 | E-400 | A | 5 | 1.33 | do | 17 | 1-2 |
| IIB-3 | E-600 | A | 2 | 1.50 | do | 27 | <1 |
| IIB-4 | E-600 | C | 10 | 2.00 | do | 45 | 1-2 |
| IIB-5 | E-1450 | C | 10 | 1.28 | Brittle wax | 47 | <1 |
| IIB-6 | E-1450 | A | 5 | 1.28 | do | 45 | <1 |
| IIB-7 | E-1450 | A | 10 | 1.28 | do | 55 | 10-25 |
| IIB-8 | E-2000 | B | 1 | 2.00 | do | 57 | 60-120 |

[a] 10% aqueous solution, °C.
[b] As in Example IC.

C. In a similar manner condensation products were prepared from mixtures of polypropylene glycol with various polyalkylenoxy triols. Typical examples of these products are given in Table 3. These products are insoluble in water, but soluble in such organic solvents as acetone, ethanol and kerosene.

TABLE 3.—WATER-INSOLUBLE PRODUCTS

| No. | Polyglycol | | Mole Ratios | | Product | Viscosity cks./100° F. |
|---|---|---|---|---|---|---|
| | Diol | Triol | Diol/Triol | OH/—CH$_2$X | | |
| IIC-1 | P-400 | C | 10 | 1.28 | Viscous liquid | 12,800 |
| IIC-2 | P-2000 | C | 1 | 2.00 | do | 844 |
| IIC-3 | P-2000 | C | 4 | 2.00 | do | 737 |
| IIC-4 | P-2000 | C | 10 | 1.25 | do | 4,900 |

*Example III.—Polyurethane elastomers*

A. To illustrate the general utility of the condensation polymers as intermediates in the synthesis of polyurethanes, adducts were prepared by the reaction of the polyols with excess tolylene diisocyanate at room temperature. After degassing for 10 to 20 minutes at 80 to 100° C., methylene bis-ortho-chloroaniline was added as an amine curing agent and the mixture poured into a preheated mold and cured for three hours at 100° C.

The resulting elastomer prepared from the polyol described in Example IA using a mole ratio of NCO/OH of 1.025 for the adduct and then a mole ratio of amine curing agent to residual NCO (NH$_2$/NCO) of 0.88 gave an elastomer with a relatively low tensile strength of 600 p.s.i., but a high elongation of about 500% and a fair tear strength of 70 as determined by the method of Federal Specification FTMS–601 M–4221.

B. In another evaluation, a sample of the polyol described in Example IA was used to cure an isocyanate adduct prepared from tolylene diisocyanate and tris-hydroxypropyl glycerine containing 27.3% NCO. When an NCO/OH ratio of 1.10 is used, the resulting elastomer had a Shore "A" hardness of 47, a tensile strength of 179 p.s.i., and an elongation of 140%. For comparison, the same formulation cross-linked with Polyglycol P–2000 had a hardness of 36, a tensile strength of 111 p.s.i., and an elongation of 126%.

The other polyols described and claimed herein may also be used in a similar manner as cross-linking and chain extension agents for polyurethanes.

We claim:
1. The polymeric condensation product of:
 (1) a poly(halomethyl)diphenyl ether having an average of from 1.75 to 3.00 halomethyl groups per diphenyl ether moiety, each halomethyl group being either chloromethyl or bromomethyl; with
 (2) a polyglycol selected from the group consisting of:
  (a) polyalkylene diols having an average molecular weight of from 300 to 10,000, and

(b) mixtures of said polyalkylenoxy diols with a polyalkylenoxy triol having an average molecular weight of from 700 to 3,000, the mole ratio of diol to triol being at least one;

the mole ratio of hydroxyl to halomethyl groups in the reaction mixture being from about 1.2 to 2.0.

2. The product of claim 1 wherein the polyalkylene diol is a polyethylene glycol.

3. The product of claim 1 wherein the polyalkylene diol is a polypropylene glycol.

4. The product of claim 1 wherein the poly(halomethyl) diphenyl ether is 4,4'-bis(chloromethyl)diphenyl ether.

5. The product of claim 4 wherein the polyalkylene diol is a polyethylene glycol.

6. The product of claim 4 wherein the polyalkylene diol is a polypropylene glycol.

7. The product of claim 4 wherein the polyglycol is a mixture of polyalkylenoxy diols and triols, the polyalkylenoxy diol being further characterized as having an average molecular weight in the range from about 400 to 2,000.

References Cited by the Examiner
UNITED STATES PATENTS 2,991,313  7/1961  Bongard _____ 260—613

OTHER REFERENCES

Doedens et al., Industrial and Engineering Chemistry, vol. 53, No. 1, January 1961, pp. 59–62.

References Cited by the Applicant
UNITED STATES PATENTS 2,911,380  11/1959  Doedens.
3,004,072  10/1961  Doedens et al.

WILLIAM H. SHORT, *Primary Examiner.*

LOUISE P. QUAST, *Examiner.*